No. 895,824. PATENTED AUG. 11, 1908.
J. L. WOODBRIDGE.
ELECTRIC GENERATOR.
APPLICATION FILED DEC. 7, 1907.
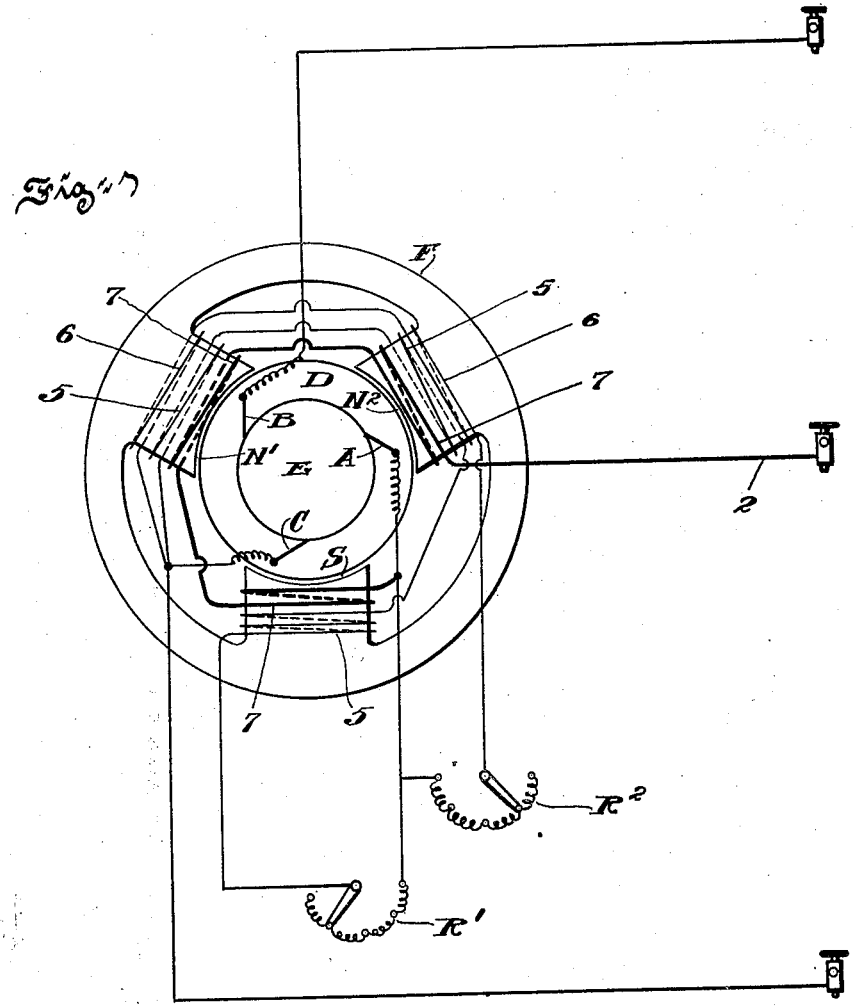
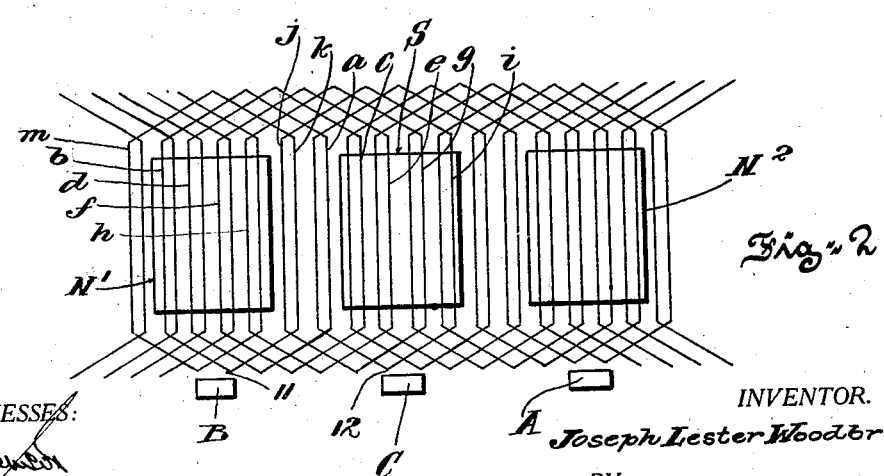
INVENTOR.
Joseph Lester Woodbridge.
BY
Augustus B Stoughton.
ATTORNEY.
WITNESSES:

UNITED STATES PATENT OFFICE.

JOSEPH LESTER WOODBRIDGE, OF PHILADELPHIA, PENNSYLVANIA.

ELECTRIC GENERATOR.

No. 895,824.  Specification of Letters Patent.  Patented Aug. 11, 1908.

Application filed December 7, 1907. Serial No. 405,588.

*To all whom it may concern:*

Be it known that I, JOSEPH LESTER WOODBRIDGE, a citizen of the United States, and resident of Philadelphia, in the county of Philadelphia and State of Pennsylvania, have invented certain new and useful Improvements in Electric Generators, of which the following is a specification.

The object of the present invention is to provide means for obtaining two different potentials from one armature winding and commutator, and to provide means for controlling the two potentials independently.

To these and other ends hereinafter set forth the invention comprises the improvements to be presently described and finally claimed.

The nature, characteristic features and scope of the invention will be more fully understood from the following description taken in connection with the accompanying drawings forming part hereof, and in which Figure 1, is a general view of a direct current generator embodying features of the invention; and Fig. 2, illustrates the armature winding of the generator shown in Fig. 1.

In Fig. 1, F, is the field frame and D, the armature of a direct current generator. The field circuit is provided with three poles S, $N^1$ and $N^2$, located at equi-distant points around the armature periphery. E, is the commutator of this generator and bearing upon the commutator are three brushes A, B and C. The armature winding, which will be described later in connection with Fig. 2, is so designed that the difference of potential between the brushes C and A, and that between the brushes C and B, may be controlled independently. As here shown the pole S, is of south polarity, while the poles of $N^1$ and $N^2$, are both of north polarity. The total magnetic flux in the field circuit passes through the pole S, but is divided between the poles $N^1$ and $N^2$. If this flux is equally divided between $N^1$ and $N^2$, the potential between the brushes A and C, will be the same as the potential between the brushes B and C. If, however, the division of flux between $N^1$ and $N^2$, is not equal, the two potentials above mentioned will be different. The total flux in the field circuit and the division of this flux between the poles $N^1$ and $N^2$ are controlled by three field windings. One of these windings 5, is wound on all three poles and is connected in shunt between the brush C and the brush A, a rheostat $R^1$, being connected into this circuit for controlling the current in this winding in the usual manner. This winding will control the total flux in the entire field circuit and with this winding alone the flux would be equally divided between $N^1$ and $N^2$. A second field winding 6, is shown wound only on the poles $N^1$ and $N^2$, and connected in shunt between the brushes C and A, with the rheostat $R^2$ in circuit. The effect of this winding is to increase the flux in $N^1$ and decrease that in $N^2$, thereby producing a higher potential between the brushes B and C and a lower potential between the brushes A and C, than would otherwise exist. The third winding 7, is connected in series between the brush A and the conductor 2, and is so designed that an increase of current in conductor 2, passing through this winding, will increase the potential between the brushes C and A, and decrease the potential between the brushes C and B.

Fig. 2, illustrates diagrammatically in the usual manner the method of winding the armature of the generator shown in Fig. 1. Rectangular areas S, $N^1$ and $N^2$, represent the pole faces of the generator, while A, B, and C, represent the three brushes. Starting from the point 11, in the armature winding under brush B and following the winding through the conductors *b, a, d, c, f, e, h, g, j, i,* to the point 12 under the brush B, it will be noted that this portion of the armature winding is affected by the flux in poles $N^1$ and S only, and that the electro-motive-force developed in each of the conductors under these pole faces will be cumulative and produce a total electro-motive-force between the brushes B and C, proportional to the sum of the magnetic flux in S, and that in $N^1$. Similarly it will be seen that the potential between the brushes C and A will be proportional to the total flux in S and $N^2$. On the other hand the potential between the brushes A and B will be proportional to the difference between the flux in $N^1$ and that in $N^2$. It will be noted also that the conductors *k* and *m*, which constitute the armature coil short circuited by the brush B, are passing through the neutral area between the pole faces and are therefore developing no electro-motive-force. The same is true of the coils short circuited by the brushes C and A. This arrangement will therefore permit satisfactory commutation to be secured.

What I claim is:

1. A generator pole frame provided with polar projections in groups of three; field windings adapted to produce in each group magnetic flux of like polarity in two of the poles of said group and in the third a flux equal to the sum of that in the other two and of opposite polarity; means for controlling the division of flux between the two poles of like polarity; and an armature in operative relation to the field poles and provided with a winding, commutator and brushes so disposed that the armature coils between any pair of brushes are acted upon by the flux in only two poles in each group of three.

2. A generator pole frame provided with polar projections in groups of three; field windings adapted to produce in each group magnetic flux of like polarity in two of the poles of said group and in the third a flux equal to the sum of that in the other two and of opposite polarity; and an armature in operative relation to the field poles and provided with a winding, commutator and brushes so disposed that the armature coils between any pair of brushes are acted upon by the flux in only two poles in each group of three.

3. A generator pole frame provided with polar projections in groups of three, field windings adapted to produce in each group a magnetic flux of like polarity but of unequal strength in two of the poles of said group and in the third a flux equal to the sum of that in the other two and of opposite polarity, and an armature in operative relation to the field poles and provided with a winding, commutator, and brushes so disposed that the armature coils between any pair of brushes are acted upon by the flux in only two poles of each group of three.

4. A field frame for a dynamo electric machine provided with poles of which more are of one polarity than are of the opposite polarity, means for producing a magnetic flux unequally distributed between the first mentioned poles, and an armature with its commutator and brushes adapted to develop unequal electromotive-forces between the brushes when the armature is revolved in the unequally distributed flux.

5. In combination a field frame for a dynamo electric machine provided with poles of which twice as many are of one polarity as are of the opposite polarity, means for producing an unequal distribution of magnetic flux between the more numerous poles of the same polarity, and an armature provided with commutator and three sets of brushes therefor adapted to develop unequal differences of potential between the different sets of brushes when the armature is rotated in the unequally distributed flux.

In testimony whereof I have hereunto signed my name.

JOSEPH LESTER WOODBRIDGE.

Witnesses:
 FRANK E. FRENCH.
 K. M. GILLIGAN.